(12) United States Patent
Matsufuji et al.

(10) Patent No.: US 6,487,924 B2
(45) Date of Patent: Dec. 3, 2002

(54) TRANSMISSION ASSEMBLY FOR WORKING VEHICLES

(75) Inventors: Mizuya Matsufuji, Sanda (JP); Takumi Fujita, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 0 days.

(21) Appl. No.: 09/882,504

(22) Filed: Jun. 15, 2001

(65) Prior Publication Data

US 2002/0026853 A1 Mar. 7, 2002

(30) Foreign Application Priority Data

Sep. 7, 2000 (JP) .......................................... 2000-271250

(51) Int. Cl.⁷ .............................. F16H 3/08; F16D 25/10
(52) U.S. Cl. .............................. 74/331; 74/330; 74/333; 192/87.1
(58) Field of Search ........................ 74/330, 331, 333, 74/335, 325, 606 R, 467; 192/87.1, 87.11, 87.12, 87.13, 87.14, 87.15, 87.16, 87.17, 87.18, 87.19

(56) References Cited

U.S. PATENT DOCUMENTS

| | | | | |
|---|---|---|---|---|
| 4,697,471 A | * | 10/1987 | Hiketa | .......................... 74/330 |
| 5,599,247 A | * | 2/1997 | Matsufuji | ..................... 74/335 |
| 6,044,720 A | | 4/2000 | Matsufuji | |
| 6,199,653 B1 | * | 3/2001 | Matsufuji et al. | ......... 192/87.15 |
| 6,269,927 B1 | * | 8/2001 | Kanenobu et al. | ........ 192/87.13 |

FOREIGN PATENT DOCUMENTS

JP 179550 * 9/1985 ................... 74/331

* cited by examiner

*Primary Examiner*—Sherry Estremsky
*Assistant Examiner*—Ha Ho

(57) ABSTRACT

Two fluid-operated supplementary speed change mechanisms (9, 10), one of which is formed into a direction-reversing mechanism and the other of which is formed into a high/low speed-selecting mechanism, are provided in a front housing 1 at locations before and behind a bearing support wall (4) which divides the inside of the front housing into front and rear chambers. Two transmission shafts (8, 12), on which fluid-operated clutches (38F, 38R, 45, 46) of the supplementary speed change mechanisms are mounted, are disposed non-coaxially and are supported by the bearing support wall, and rotary joints (54F, 54R, 54L, 55H, 55L) for connecting fluid passages (51F, 51R, 51L, 52H, 52L) in the transmission shafts, which passages are in fluid communication with the fluid-operated clutches, to stationary fluid passages are formed in outer circumferences of the transmission shafts within an inside of the single bearing support wall.

7 Claims, 7 Drawing Sheets

TRANSMISSION ASSEMBLY FOR WORKING VEHICLES

FIELD OF THE INVENTION

This invention relates to a transmission assembly for a working vehicle comprising a front housing and a transmission case which are arranged in series in a longitudinal direction of the vehicle and are fastened together. The front housing includes at its front end portion an engine flywheel and the transmission case includes at least one speed change mechanism. More particularly, the present invention relates to a transmission assembly in which two fluid-operated supplementary speed change mechanisms are provided within the front housing in such a manner that does not lengthen the front housing.

BACKGROUND OF THE INVENTION

In a fluid-operated speed change mechanism having plural fluid-operated clutches, fluid passages communicated to the plural clutches are formed in a transmission shaft on which the plural clutches are mounted. The fluid passages in the transmission shaft will rotate together with the rotation of the transmission shaft. Thus, rotary joints are required for connecting the fluid passages in the transmission shaft to stationary fluid passages. In a transmission assembly in which two fluid-operated speed change mechanisms are provided, such rotary joints are formed in outer circumferences of two transmission shafts, on which respective plural fluid-operated clutches of the respective change mechanisms are mounted, such that two sets of the rotary joints are placed within two separate bearing support members which support the two transmission shafts, as shown, for example, in U.S. Pat. No. 6,044,720. Each of the bearing support members is made thick in a longitudinal direction of the vehicle because of the plural rotary joints included therein. Thus, the two separate bearing support members each of which is thick will lengthen the transmission assembly and, therefore, the vehicle.

Accordingly, a primary object of the present invention is to provide a novel transmission assembly for a working vehicle in which two supplementary speed change mechanisms are provided in a front housing, having an engine flywheel at a front end portion thereof, with preventing the front housing from being lengthened by taking measures how to form the rotary joints between rotatable and stationary fluid passages.

An attendant object of the invention is to provide a novel transmission assembly which is as simple in structure as possible.

Another attendant object is to provide a novel transmission assembly which is easy in assembling.

SUMMARY OF THE INVENTION

The present invention relates to a transmission assembly in a working vehicle comprising a front housing (1) and a transmission case (2) which are arranged in series in a longitudinal direction of the vehicle and are fastened together. The front housing includes at its front end portion an engine flywheel (6), and the transmission case includes at least one speed change mechanism (14, 15). The transmission assembly according to the present invention is characterized in:

that there are provided within the front housing (1) two fluid-operated supplementary speed change mechanisms (9, 10) which are disposed before and behind a bearing support wall (4) and are connected to each other in series, the bearing support wall dividing the inside of the front housing into front and rear chambers, one of the supplementary speed change mechanisms being formed into a direction-reversing mechanism and the other of the supplementary speed change mechanisms being formed into a high/low speed-selecting mechanism, and that two transmission shafts (8, 12), on which fluid-operated clutches (38F, 38R, 45, 46) of the supplementary speed change mechanisms (9, 10) are mounted, are disposed non-coaxially with each other and are supported by the bearing support wall (4), rotary joints (54F, 54R, 54L, 55H, 55L) for connecting fluid passages (51F, 51R, 51L, 52H, 52L), which are formed in the two transmission shafts and are communicated with the fluid-operated clutches, to stationary fluid passages being formed in outer circumferences of the two transmission shafts (8, 12) at an inside of the bearing support wall (4).

In the transmission assembly in which two supplementary speed change mechanisms are provided within the front housing before and behind a bearing support wall which divides the inside of the front housing into front and rear chambers, the two transmission shafts on which fluid-operated clutches are mounted are disposed, according to the present invention, non-coaxially with each other and the rotary joints (54F, 54R, 54L, 55H, 55L) for connecting fluid passages in the two transmission shafts are particularly formed in the outer circumferences of the two transmission shafts (8, 12) at an inside of the single bearing support wall (4). Thus, only the single support wall (4) is used for forming the rotary joints, so that the front housing and, therefore, the vehicle are prevented from being lengthened.

For simplifying the structure of the transmission assembly, it is preferred that one of the two fluid-operated clutches (45) of the high/low speed-selecting mechanism (10) is formed into a fluid-actuated clutch which is actuated by the action of fluid pressure and is disactuated by the action of a spring (45a) whereas the other of the two fluid-operated clutches (46) of the high/low speed-selecting mechanism is formed into a spring-actuated clutch which is actuated by the action of a spring (46a) and is disactuated by the action of fluid pressure, the two fluid-operated clutches (45, 46) being adapted to be supplied with fluid pressure at a same time through a single fluid passage (52H) formed in the transmission shaft (12) on which the two fluid-operated clutches are mounted. According to this structure, an operating fluid passage to be formed in the above-referenced transmission shaft can be made single.

For an easy assembly, it is preferred that the bearing support wall (4) is detachably secured to the front housing (1).

For an easy assembly, too, it is preferred that there is detachably secured to an outer wall of the front housing (1) a fluid passage-forming plate (57) including fluid passages (61F, 61R, 61L, 62H, 621) which are in fluid communication with the rotary joints (54F, 54R, 54L, 55H, 55L), the fluid passages and the rotary joints being connected through pipes (63F, 63R, 63L, 64H, 64L) which extend through openings (65, 66) formed in the outer wall of the front housing (1).

For simplifying the structure of the transmission assembly set forth above, it is preferred that a directional control valve (90) for the direction-reversing mechanism (9) and a directional control valve (76) for the high/low speed-selecting mechanism (10) are attached to the fluid-passage-forming plate (57). The directional control valves (90, 76) are provided at locations as near to the supplementary speed change mechanisms (9, 10) as possible, so that lowering of fluid pressure between the directional control valves and the two supplementary speed change mechanisms is small.

It is often the cases that the fluid-operated clutches of the direction-reversing mechanism are selectively engaged in a slipping condition by selectively reducing fluid pressure applied thereto so as to achieve running of the vehicle at a reduced speed. According to a preferred embodiment of the present invention, the transmission shaft (8) of the direction-reversing mechanism (9), which is disposed at an upstream side of the high/low speed-selecting mechanism (10), is arranged at a level higher than the level of the transmission shaft (12) of the high/low speed-selecting mechanism. According to this structure, the transmission shaft (8), on which the fluid-operated clutches (38F, 38R) of the direction-reversing mechanism are mounted, can be arranged at such a high level that the fluid-operated clutches are not immersed in lubricant oil which is accomodated in a low level within the front housing. Thus, the control for reducing fluid pressure applied to the fluid-operated clutches is not damaged by lubricant oil which might otherwise exist between frictional elements of the fluid-operated clutches, so that the fluid pressure-reducing control can be performed reliably.

According to another preferred embodiment of the present invention, the bearing support wall (4) is detachably secured to the front housing (1) and another bearing support wall (5) is detachably secured to the front housing at a location spaced from and behind the bearing support wall, one of the supplementary speed change mechanisms (9) being disposed before the bearing support wall (4) whereas the other of the supplementary speed change mechanisms (10) being disposed between the bearing support wall (4) and the another bearing support wall (5). According to this structure, the fluid-operated direction-reversing mechanism and high/low speed-selecting mechanism both requiring a high accuracy can be assembled into the front housing as a package for which the bearing support wall and another bearing support wall are used as support members for the supplementary speed change mechanisms.

BRIEF DESCRIPTION OF THE DRAWINGS

The present invention and its attendant advantages will become more readily apparent as the specification is considered in conjunction with the accompanying drawings in which.

DESCRIPTION OF A PREFERRED EMBODIMENT

Figure 1:
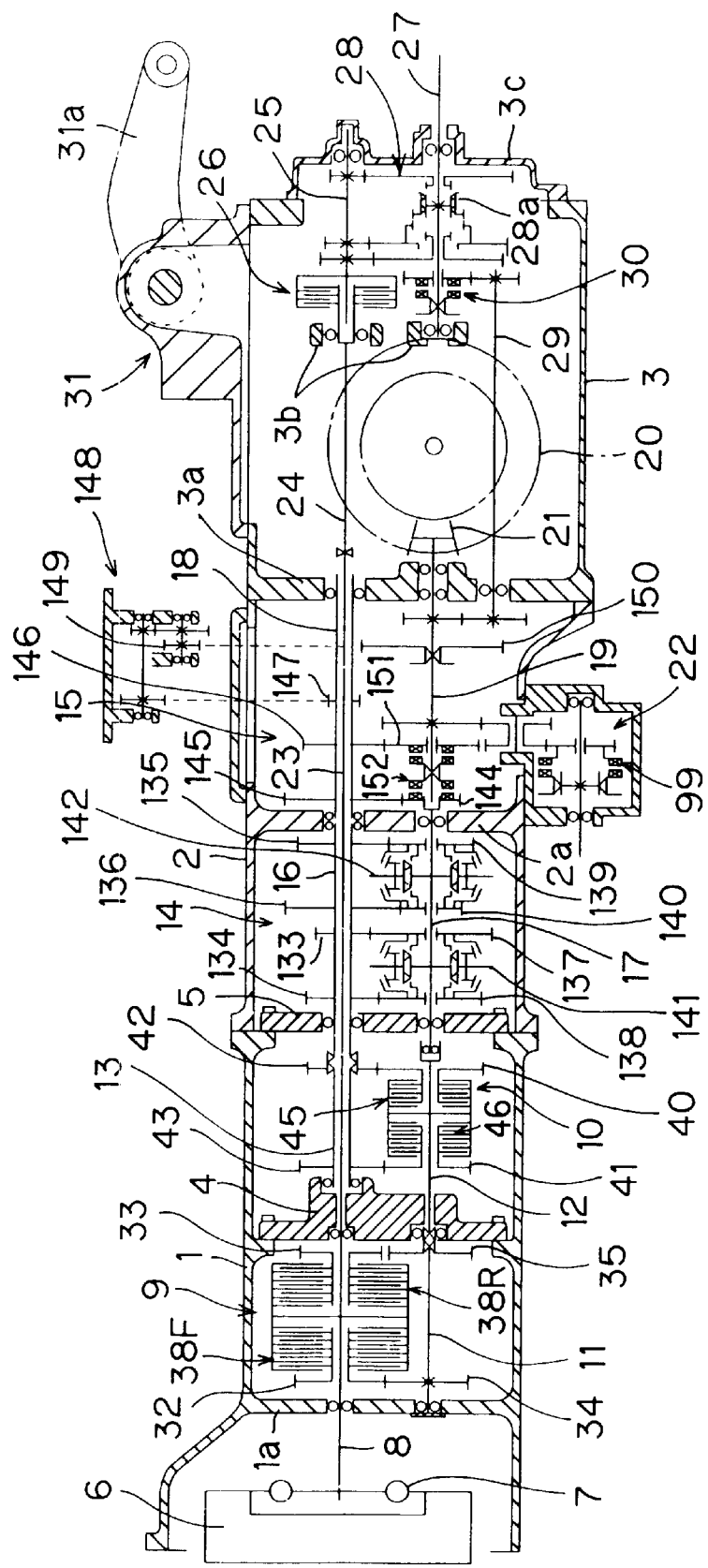
FIG. 1 is a diagram showing a transmission system employed in a tractor in which an embodiment of the present invention is employed.

FIG. 1 depicts a transmission system of a tractor in which an embodiment of the transmission assembly according to the present invention is employed. The vehicle body of the tractor is composed of a front housing, a transmission case 2 and a rear housing 3 which are arranged in series in a longitudinal direction of the tractor and are fastened together. The front housing 1 includes in it an integral support wall 1a at an intermediate portion thereof, a first bearing support wall 4 which is secured to the front housing 1 such that it divides an internal space in the front housing behind the support wall 1a into front and rear chambers, and a second bearing support wall 5 which is secured to the front housing 1 at a rear end thereof. The transmission case 2 includes in it an integral support wall 2a at an intermediate portion thereof, and the rear housing 3 includes a front wall 3a. a support wall 3b at an intermediate portion thereof, and a rear cover 3c which closes a rear end opening of the rear housing 3. An engine flywheel 6 is provided at a front end of the interior of front housing 1. The front housing 1 includes a primary drive shaft 8 which is connected to the engine flywheel 6 through a bumper coupling 7.

The vehicle drive transmission line includes at an inside of the front housing 1 two supplementary speed change mechanisms, namely a direction-reversing mechanism 9 and a high/low speed-selecting mechanism 10. The direction-reversing mechanism 9, which is arranged between the support wall 1a and the first bearing support wall 4, is disposed between the primary drive shaft 8 and a transmission shaft 11 which is arranged below the primary drive shaft 8. The high/low speed-selecting mechanism 10, which is arranged between the first and second bearing support walls 4 and 5, is disposed between another transmission shaft 12, which is coupled to a rear end of the transmission shaft 11, and a hollow driven shaft 13 which is arranged coaxially with and behind the primary drive shaft 8. The transmission case 2 includes a main speed change mechanism 14 and an auxiliary speed change mechanism 15. The main speed change mechanism 14 which is arranged in a front half of the transmission case 2, is disposed between a hollow drive shaft 16, which is coupled to a rear end of the driven shaft 13, and another driven shaft 17 which is arranged coaxially with and behind the transmission shaft 12. The auxiliary speed change mechanism 15, which is arranged in a rear half of the transmission case 2, is disposed between the driven shaft 17 and a propeller shaft 19, which is arranged coaxially with and behind the driven shaft 17, and it includes a hollow counter shaft 18 which is arranged coaxially with and behind the drive shaft 16. A rear end of the propeller shaft 19 extends into the rear housing 3 and has a bevel pinion 21 which is meshed with an input bevel gear 20 of a differential gearing (not shown) for left and right rear wheels. A power take-off mechanism 22 for taking-off front wheel-driving power from the propeller shaft 19 is also provided and it is attached to a bottom wall of the transmission case 2.

PTO transmission line includes a transmission shaft 23 which is coupled to the primary drive shaft 8 and which extends through the hollow driven shaft 13, drive shaft 16 and counter shaft 18 into the rear housing 3. Another transmission shaft 24 is coupled to the transmission shaft 23, and a further transmission shaft 25 is arranged coaxially with and behind the transmission shaft 24. A fluid-operated PTO clutch 26 is disposed between the transmission shafts 24 and 25. A PTO speed change mechanism 28 is disposed between the transmission shaft 25 and a PTO shaft 27 which extends rearwardly of the rear housing 3 through the rear cover 3c. A transmission shaft 29, which is driven to rotate by the propeller shaft 19, is also provided for driving the PTO shaft 27 at a speed proportional to that of the propeller shaft and a gear, which is rotatably mounted on the PTO shaft and is driven to rotate by the transmission shaft 29, is coupled selectively to the PTO shaft 27 by a clutch 30.

On an upper surface of the rear housing 3, there is mounted a hydraulic lift mechanism 31 comprising left and right lift arms 31a for lifting and lowering an auxiliary implement (not shown) which is driven by the PTO shaft 27.

Figure 2:
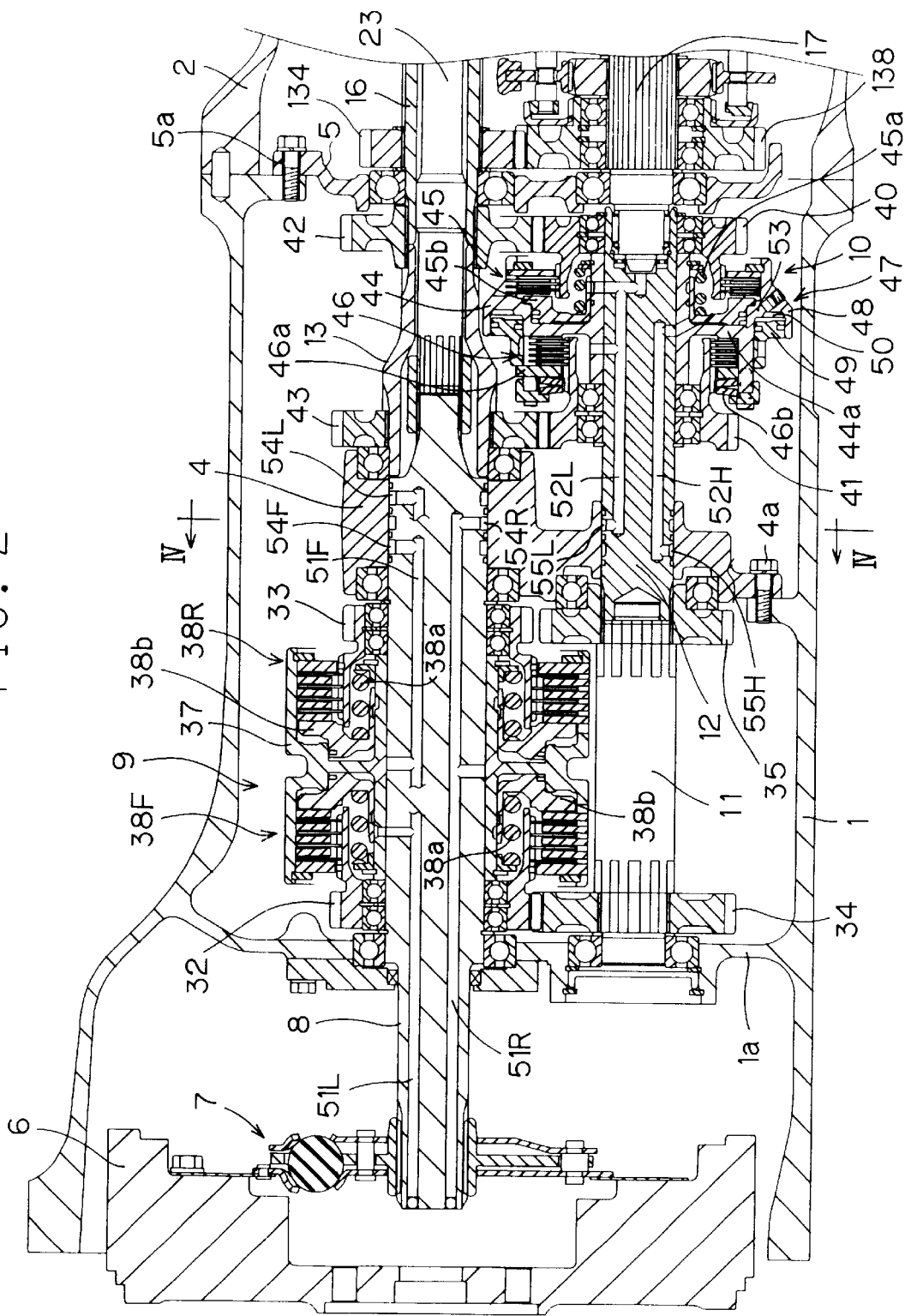
FIG. 2 is a sectional side view of a front housing of the tractor.
Figure 3:
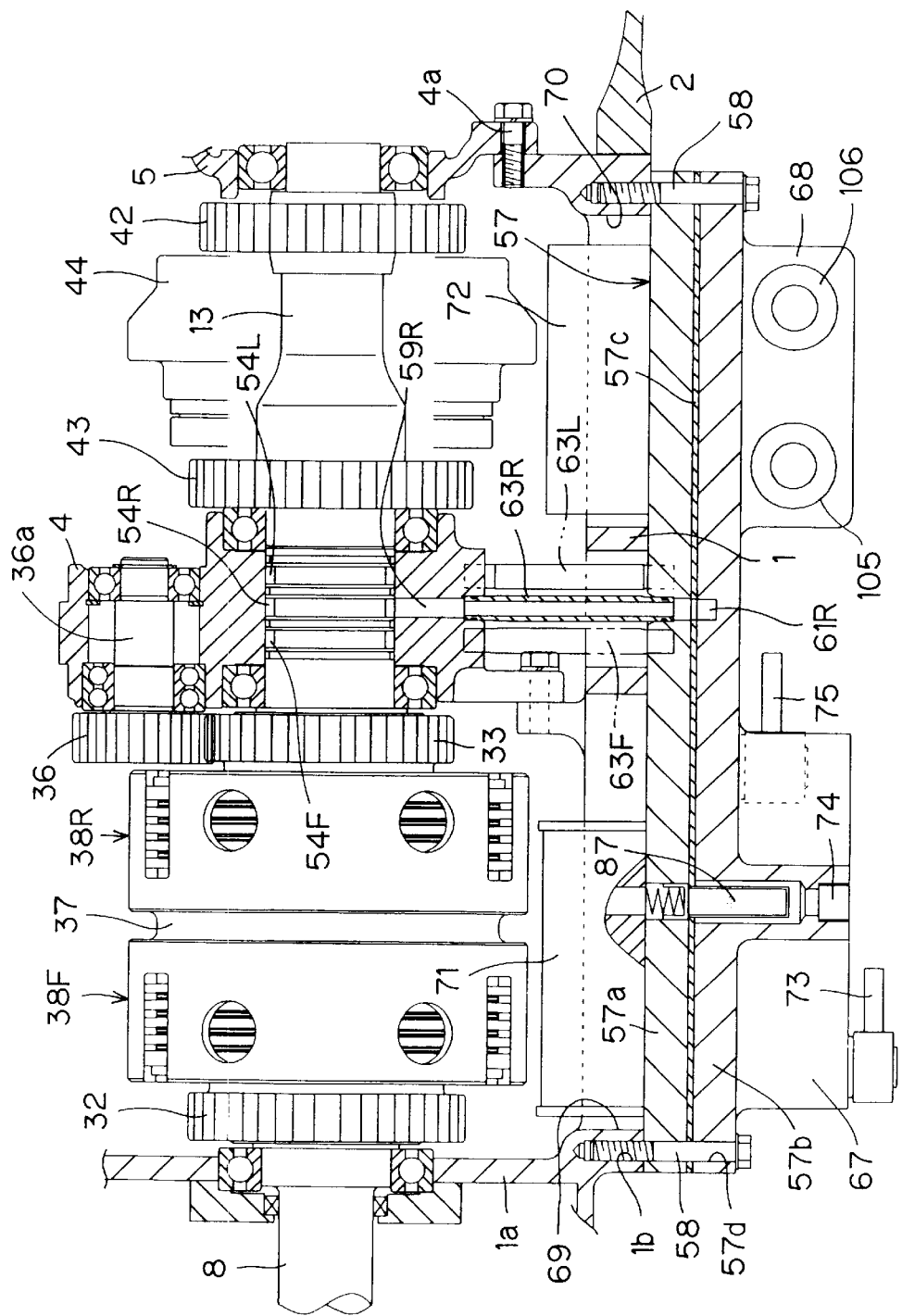
FIG. 3 is a sectional plane view showing a part of the front housing.
Figure 4:
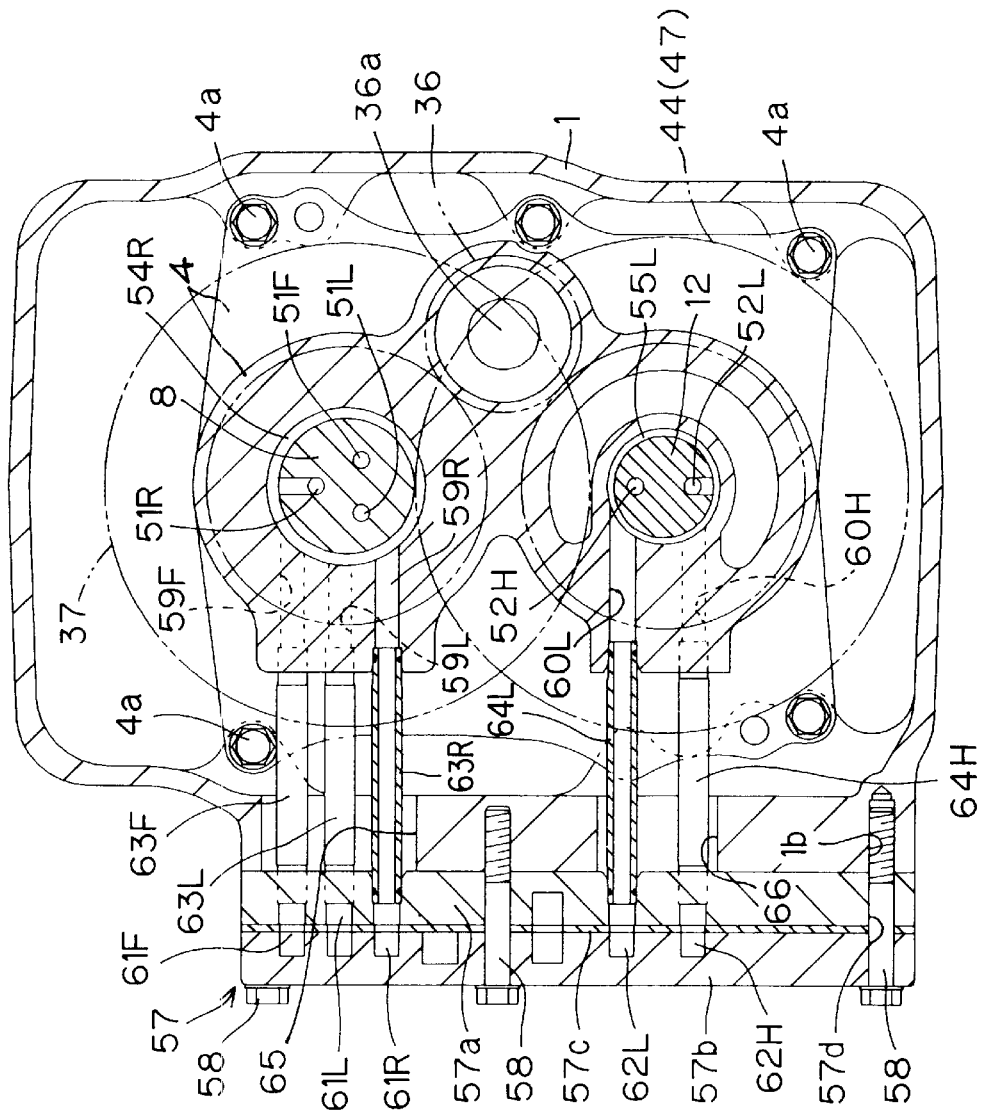
FIG. 4 is a sectional rear view taken generally along line IV—IV of FIG. 2.

FIG. 2 depicts the transmission mechanism in the front housing 1. The first and second bearing support walls 4 and 5 are detachably secured to internal boss portions of the front housing 1 using bolts 4a and 5a, respectively. The direction-reversing mechanism 9 comprises two gears 32 and 33, which are rotatably mounted on the primary drive shaft 8, and two gears 34 and 35 which are fixedly mounted on the transmission shaft 11. The gears 32 and 34 are meshed directly, and the gears 33 and 35 are meshed through an idler gear 36 (FIGS. 3 and 4). On the primary drive shaft 8 and between the gears 32 and 33, there are mounted a forward directional fluid-operated clutch 38F and a backward directional fluid-operated clutch 38R for which a common clutch housing 37 is fixedly mounted on the primary drive shaft 8. Each of the fluid-operated clutches 38F and 38R is formed into a well-known multi-frictional disc type comprising alternately arranged first frictional elements and second frictional elements which are slidably but non-rotatably supported by the clutch housing 37 and by the boss portion of each gear 32, 33, and a piston 38b which is disposed within the clutch housing 37 such that it is biased to move away from the frictional elements by a return spring 38a. Each fluid-operated clutch 38F, 38R is actuated by applying fluid pressure to the piston 38b so as to move it toward the frictional elements and to thereby engage the same. The transsmission shaft 11 is driven to rotate so as to drive the vehicle to run into a forward direction when the forward directional fluid-operated clutch 38F is actuated so as to couple the gear 32 to the primary drive shaft 8, whereas the transsmission shaft 11 is driven to rotate so as to drive the vehicle to run into a backward direction when the backward directional fluid-operated clutch 38R is actuated so as to couple the gear 33 to the primary drive shaft 8.

The high/low speed-selecting mechanism 10 comprises two gears 40 and 41 which are rotatably mounted on the transmission shaft 12 which is in turn coupled to the transmission shaft 11 using a boss portion of the gear 35, and two gears 42 and 43 which are fixedly mounted on the driven shaft 13. The gears 40 and 42 are meshed so as to provide a high speed gear train, and the gears 41 and 43 are meshed so as to provide a low speed gear train. On the transmission shaft 12 and between the gears 40 and 41, there are disposed two fluid-operated clutches 45 and 46 for which a common clutch housing 44 is fixedly mounted on the transmission shaft 12. The fluid-operated clutch 45 is operable to couple the gear 40 to the transmission shaft 12, and the fluid-operated clutch 46 is operable to couple the gear 41 to the transmission shaft 12. The clutch housing 44 has, at its axial middle portion, a partition 44a which separates the fluid-operated clutches 45 and 46 from each other.

Of these fluid-operated clutches 45 and 46, the fluid-operated clutch 45 is formed into a fluid-actuated clutch comprising alternately arranged first frictional elements and second frictional elements which are slidably but non-rotatably supported respectively by the clutch housing 44 and by a boss portion of the gear 40, and a piston 45b which is disposed within the clutch housing 44 and is biased to move away from the frictional elements by a return spring 45a. When a fluid pressure is applied to the piston 45b so as to move it toward the frictional elements and to thereby engage the same, the fluid-operated clutch 45 is engaged. Contrary, the other fluid-operated clutch 46 is formed into a spring-actuated clutch comprising alternately arranged first frictional elements and second frictional elements which are slidably but non-rotatably supported respectively by the clutch housing 44 and by a boss portion of the gear 41, a push plate 46a which is slidably but non-rotatably supported by the clutch housing 44 and is faced to the frictional elements from a side opposite to the partition 44a, and two leaf springs 46b which are arranged between the push plate 44a and a retainer ring secured to the clutch housing 44 so as to bias the push plate 46a to move toward the frictional elements to thereby engage the same between the partition 44a and the push plate 46a.

For disengaging the fluid-operated clutch 46, there is provided a hydraulic cylinder 47 comprising an annular cylinder portion 48, which is formed integral with the clutch housing 44 at an outer circumferential portion of the partition 44a, and an annular piston 49 which is slidably received in the cylinder portion 48 in a fluid-tight manner. The piston 49 has an extension extending toward the push plate 46a which is supported by the clutch housing 44 by inserting plural projections on an outer periphery thereof into plural slots in the clutch housing 44, and the extension of the piston 49 abuts against the free ends of the projections, which project outwardly of the clutch housing 44, such that, when the piston 49 is advanced by a fluid pressure supplied to a fluid chamber 50 in the cylinder portion 48 so as to move the push plate 46a against the biasing force of spring 46b, the fluid-operated clutch 46 becomes disengaged.

The primary drive shaft 8 includes in it fluid passages 51F and 51R for supplying operating fluid to the fluid-operated clutches 38F and 38R of the direction-reversing mechanism 9 and a fluid passage 51L for supplying lubricant to the fluid-operated clutches 38F and 38R. The transmission shaft 12 includes in it a fluid passage 52H for supplying operating fluid to the fluid-operated clutch 45 of the high/low speed-selecting mechanism 10 and a fluid passage 52L for supplying lubricant to the fluid-operated clutches 45 and 46 of that mechanism 10. For disengaging the fluid-operated clutch 46, a fluid chamber, which is formed within the clutch housing 44 for actuating the fluid-operated clutch 45, is communicated to the fluid chamber 50 behind the piston 49 through a fluid passage 53 formed in the clutch housing 44. Thus, the fluid-operated clutch 45 is engaged and the fluid-operated clutch 46 is disengaged when a fluid pressure is supplied through the fluid passage 52H, whereas the fluid-operated clutch 46 is engaged due to a biasing force of the leaf springs 45b and the fluid-operated clutch 45 is disengaged when a fluid pressure is drained to the fluid passage 52H.

A rear end portion of the primary drive shaft 8 and a front end portion of the transmission shaft 12 are supported respectively by the bearing support wall 4. The fluid passages 51F, 51R and 51L in the primary drive shaft 8 open respectively into annular grooves 54F, 54R and 54L in an outer circumference of the primary drive shaft 8 at an inside of the bearing support wall 4 so as to provide rotary joints for connecting the rotating fluid passages 51F, 51R and 51L to stationary fluid passages. Similarly, the fluid passages 52H and 52L in the transmission shaft 12 open respectively into annular grooves 55H and 55L in an outer circumference of the transmission shaft 12 at an inside of the bearing support wall 4 so as to provide rotary joints for connecting the rotating fluid passages 52H and 52L to stationary fluid passages. Additionally, the lubricant fluid passage 52L in the transmission shaft 12 is conducted to a bearing support bore of a rear end of the transmission shaft 12 at which a front end of the driven shaft 17 is rotatable supported.

Figure 5:
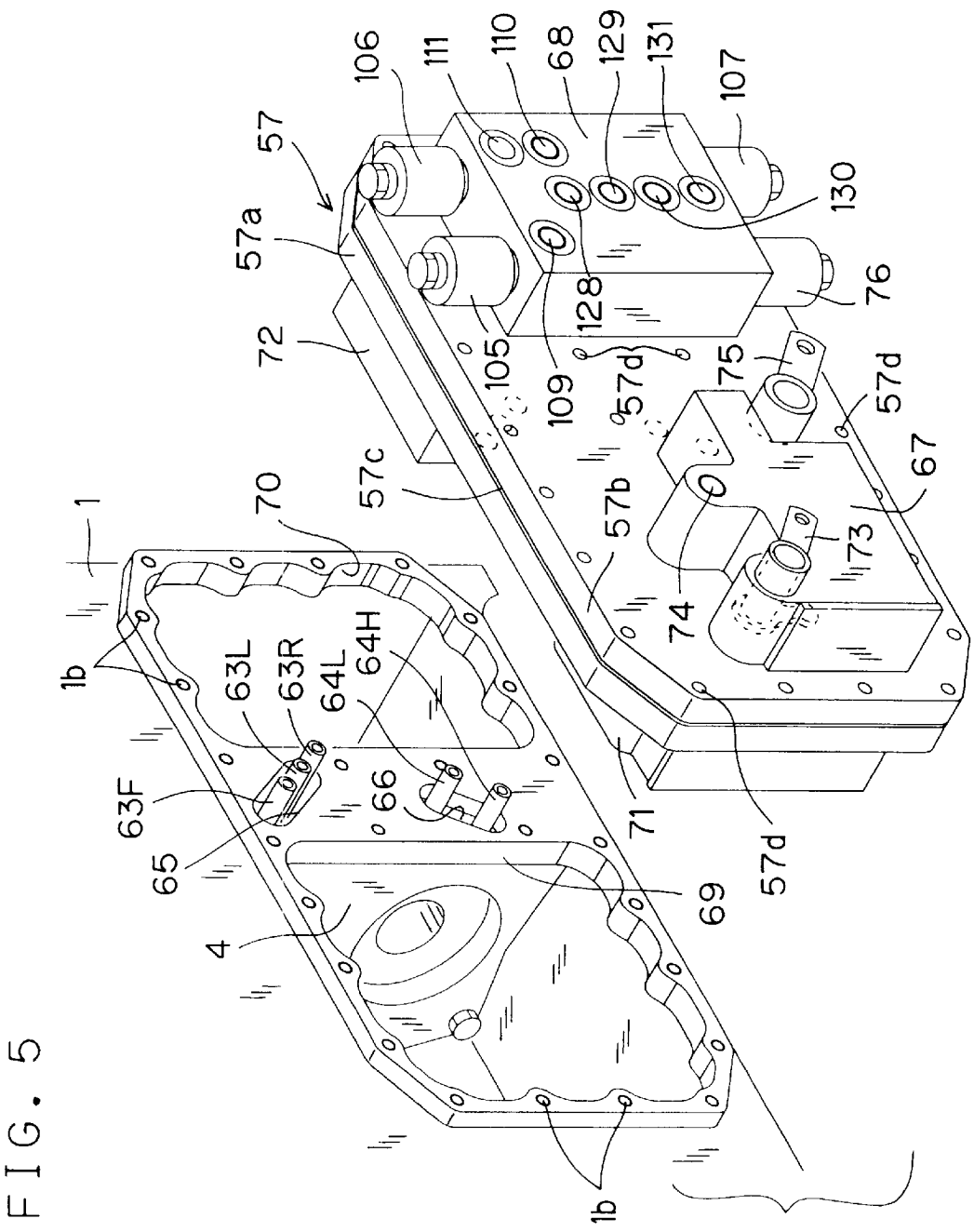
FIG. 5 is a perspective view showing an exploded condition of some components.

As shown in FIGS. 3 to 5, a fluid passage-forming plate 57 comprising inner and outer plate members 57a and 57b and a seal member 57c therebetween is secured to an outer surface of a side wall of the front housing 1 using bolts 58 which extend through bores 57d of the fluid passage-forming plate 57 and which are threadingly engaged into threaded bores 1b of the front housing 1. The bearing support wall 4 includes fluid passages 59F, 59R, 59L and 60H, 60L which extend laterally of the support wall 4 and open respectively at the annular grooves or rotary joints 54F, 54P, 54L and 55H, 55L and at a side surface of the support wall 4, and the fluid passage-forming plate 57 includes fluid passages 61F, 61R, 61L and 62H, 62L which open respectively at an inner surface of the plate 57. The fluid passages 59F, 59R, 59L and 60H, 60L and the fluid passages 61F, 61R, 61L and 62H, 62L are connected to one another through pipes 63F, 63R, 63L and 64H, 64L which are bridged between the bearing support wall 4 and the fluid passage-forming plate 57, respectively. The side wall of front housing 1 includes an opening 65 for passing the pipes 63F, 63R and 63L and another opening 66 for passing the pipes 64H and 64L.

Two valve housings 67 and 68 are attached to an outer surface of the fluid passage-forming plate 57, and two valve housings 71 and 72, which are inserted into the front housing 1 through openings 69 and 70 in the side wall of front hosing 1, are attached to an inner surface of the fluid-passage-forming plate 57. The valve housing 67 includes in it a directional control valve 90 (FIG. 6) for the direction-reversing mechanism 9 and is associated with a control arm 73 for the control valve. A fluid supply port 74 is provided also to the valve housing 67. The valve housing 71 includes a pressure-reducing valve etc. for the direction-reversing mechanism 9, and a control arm 75 for the reducing valve is arranged at an outer location of the fluid passage-forming plate 57. A directional control valve 76 for the high/low speed-selecting mechanism 10 is attached to the valve housing 68.

Figure 6:
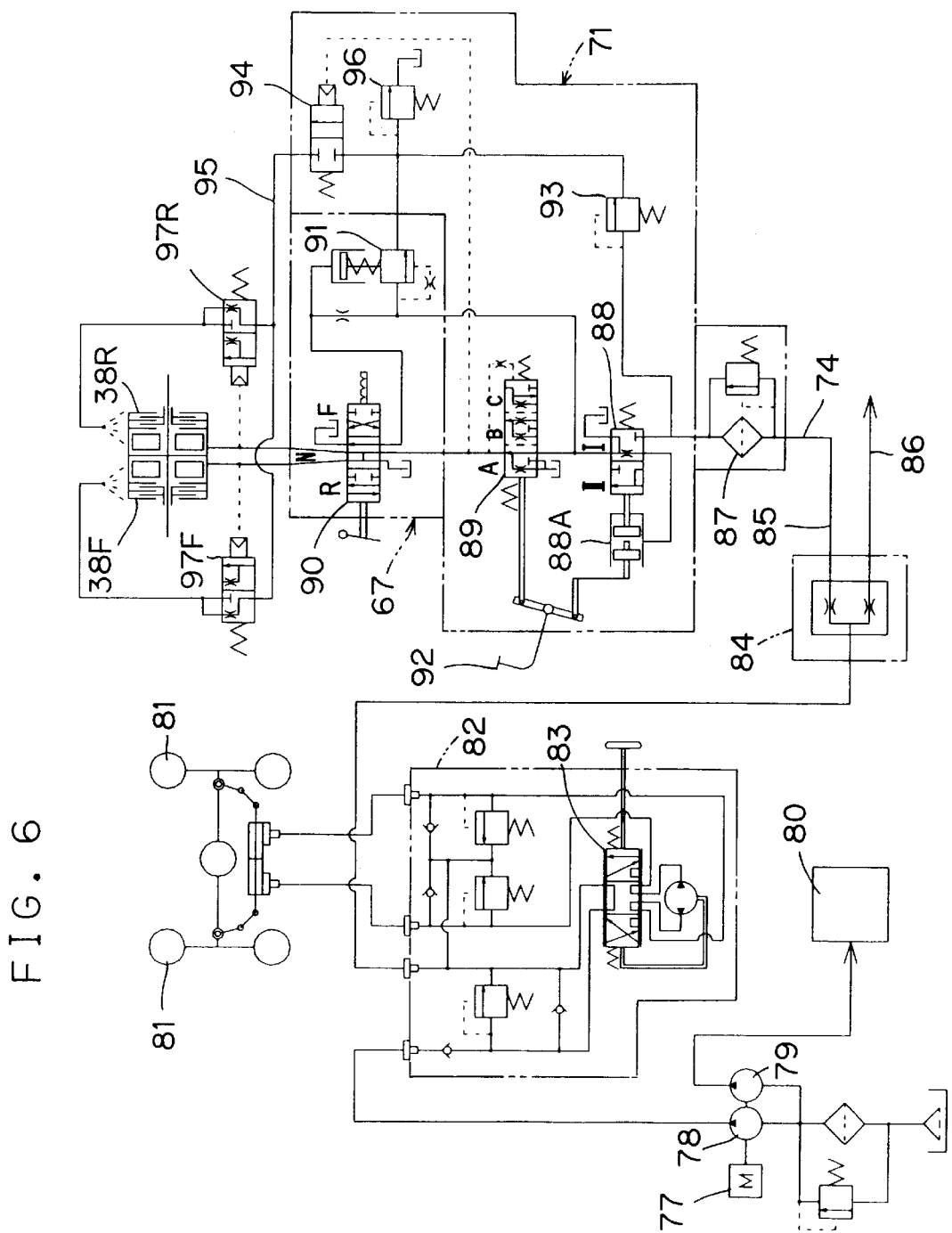
FIG. 6 is a circuit diagram showing a fluid circuit.
Figure 7:
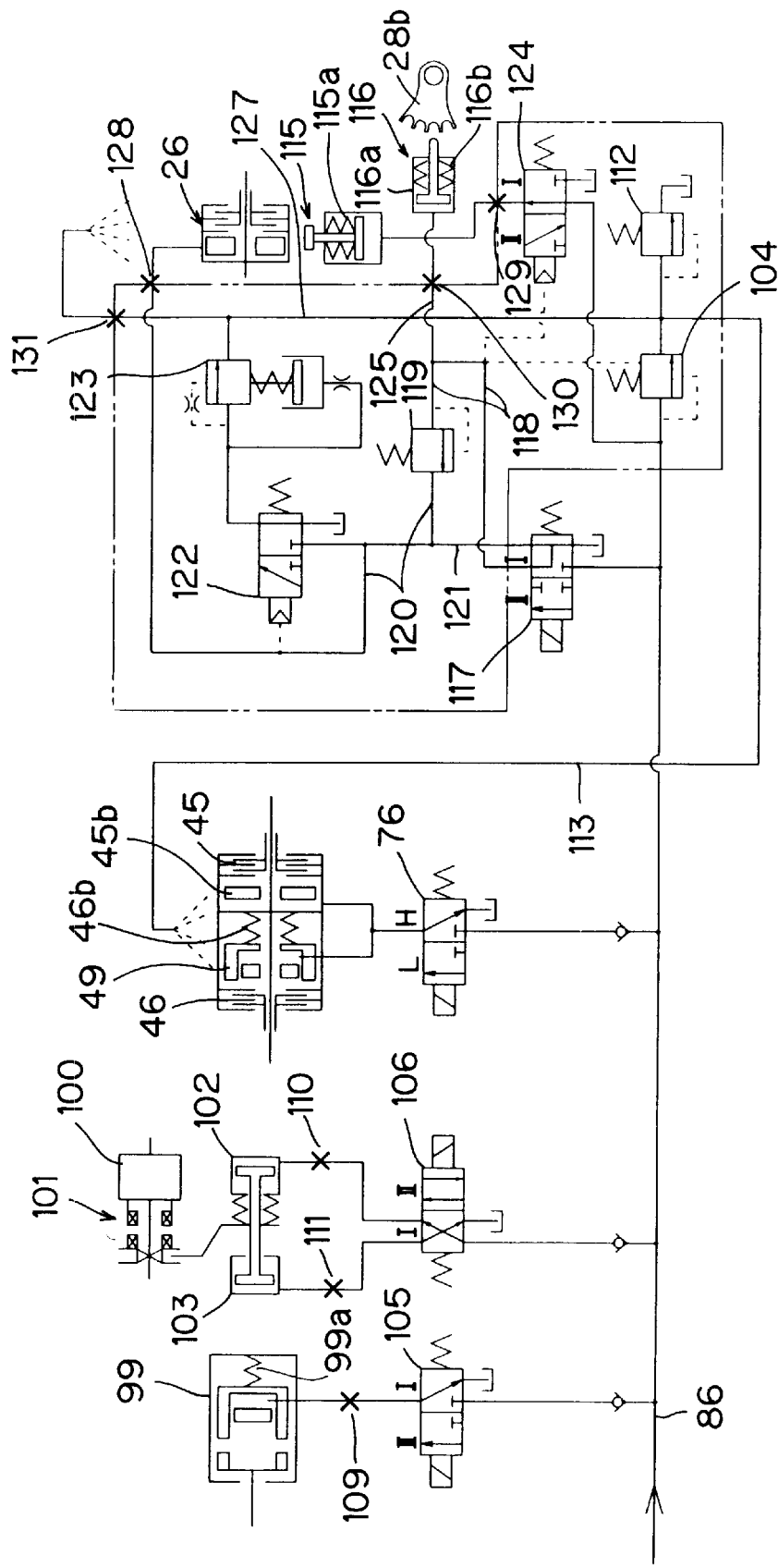
FIG. 7 is a circuit diagram showing a fluid circuit succeeded to the one shown in FIG. 6.

Valve assemblies are shown in FIGS. 6 and 7 and will be detailed hereinafter. As shown in FIG. 6, there are provided two hydraulic pumps 78 and 79 which are driven by an engine 77. One of the hydraulic pumps 79 is used for supplying fluid to a control valve mechanism 80 for the above-referenced hydraulic lift mechanism 31. The other hydraulic pump 78 is used for supplying fluid to a directional control valve 83 for a power steering mechanism 82 which is employed for turning left and right front wheels 81 for a steering purpose, and an excessive fluid is divided into two flows by a flow divider valve 84. One of the divided flows is supplied through a divided flow path 85 to the fluid-operated clutches 38F and 38R of direction-reversing mechanism 9, and the other divided flow is supplied through a divided flow path 86 to the fluid-operated clutches 45 and 46 of high/low speed-selecting mechanism 10 etc. shown in FIG. 7.

Valve assembly for the direction-reversing mechanism 9 shown in FIG. 6 is already well-known and, therefore, will be detailed briefly. The divided flow path 85 is connected at the downstream side of a line filter 87 to the fluid-operated clutches 38F and 38R through a shut-off valve 88, a pressure-reducing valve 89 and a directional control valve 90. The shut-off valve 88 has a shut-off position I and an open position II, and it is operable at its shut-off position I to drain fluid from a fluid path connecting between the shut-off valve 88 and pressure-reducing valve 89. The pressure-reducing valve 89 is operable to reduce fluid pressure in a fluid path connecting between the reducing valve 89 and directional control valve 90 and has a non-operative position A in which the directional control valve 90 is connected to the shut-off valve 88 without any substantial reduction in fluid pressure, a pressure-reducing position B in which the directional control valve 90 is connected to the shut-off valve 88 in a variably throttled condition so as to variably reduce fluid pressure in the fluid path between the pressure-reducing valve 89 and directional control valve 90, and an unloading position C in which fluid is drained from the fluid path between the pressure-reducing valve 89 and directional control valve 90. The directional control valve 90 has a neutral position N, a forward directional position F in which the forward directional fluid-operated clutch 38F is actuated, and a backward directional position R in which the backward directional fluid-operated clutch 38R is actuated. To the fluid path connecting between the shut-off valve 88 and pressure-reducing valve 89 is connected a modulating-type relief valve 91 which is operable to increase fluid pressure applied to the fluid-operated clutch 38F or 38R gradually as from the time when the directional control valve 90 is displaced to its operative position F or R.

The pressure-reducing valve 89 is adapted to be operated by a pedal 92, and there is provided a cylinder mechanism 88A which is operable to displace the shut-off valve 88 mechanically from the shut-off position I to the open position II in response to the operation of pedal 92. The cylinder mechanism 88A is designed such that, once the shut-off valve 88 is displaced to its open position II, it is kept in that open position II by fluid pressure in the fluid path between the shut-off valve 88 and pressure-reducing valve 89, which pressure is applied to the cylinder mechanism through the shut-off valve 88, even after the pedal 92 is returned to its original position. The pedal 92 is depressed fully at a stopped condition of the vehicle so as to displace the pressure-reducing valve 89 to its unloading position C and, at the same time, to displace the shut-off valve 88 to its open position II. Then, the pedal 92 is released gradually so as to return the pressure-reducing valve 89 to its non-operative position A via the pressure-reducing position B, whereby the vehicle is started gradually. The pedal 92 can be depressed in an optional degree during the running of vehicle so as to achieve an optional pressure-reduced condition by the pressure-reducing valve 89, whereby the fluid-operated clutch 38F or 38R is operated in a slipped condition so that the vehicle can run at a reduced speed.

A relief path from a main relief valve 93 for determining fluid pressure in the divided flow path 85 is joined with a relief path from the modulating-type relief valve 91, and an on-off valve 94, which is adapted to open by fluid pressure at the downstream side of pressure-reducing valve 89, is incorporated in the joined path. A lubricant supply path 95 is led out from the on-off valve 94 for supplying lubricant to the fluid-operated clutches 38F and 38R at a fluid pressure determined by a relief valve 96, in a fluid path for conducting the lubricant supply path 95 to each fluid-operated clutch 38F, 38R, there is provided a flow regulator valve 97F, 97R which is operable to increase the flow of lubricant only at an engaged condition of the clutch 38F, 38R by means of the piston 38b shown in FIG. 2.

The directional control valve 90 and modulating-type relief valve 91 are accommodated in the valve housing 67 shown in FIGS. 3 and 5, and the shut-off valve 88, pressure-reducing valve 89, relief valves 93 and 96, and on-off valve 94 are accommodated in the valve housing 71 also shown in FIGS. 3 and 5. The fluid passages 61F and 61R in the fluid passage-forming plate 57 shown in FIG. 4 are communicated to the clutch-connecting ports for connecting the directional control valve 90 to the fluid-operated clutches 38F and 38R, and the fluid passage 61L is communicated to the outlet port of on-off valve 94.

As shown in FIG. 7, the divided flow path 86 from the flow divider valve 84 is used not only for supplying fluid to the fluid-operated clutches 45 and 46 of high/low speed-selecting mechanism 10 but for supplying fluid to a front wheel-drive clutch 99 provided in the power take-off mechanism 22, to a pair of hydraulic cylinders 102 and 103 for operating a differential-lock clutch 101 which is associated with a differential gearing 100 for the left and right rear wheels, and to the PTO clutch 26, respectively. Fluid pressure in the divided flow path 86 is determined by a relief valve 104. As shown in FIG. 5, there are attached to the valve housing 68 not only the directional control valve 76 for the high/low speed-selecting mechanism 10 but a directional control valve 105 for the front wheel-drive clutch 99, a directional control valve 106 for the hydraulic cylinders 102 and 103, and a directional control valve 107 for the PTO clutch 26, respectively. The other valve assembly for the PTO clutch 26 is included in the valve housing 72.

As shown in FIG. 7, the front wheel-drive clutch 99 is designed such that it is engaged by the action of a spring 99a and is disengaged by the action of fluid pressure. The directional control valve 105 for the drive clutch 99 has a clutch-engaging position I and a clutch-disengaging position II. A connecting port 109 for connecting the directional control valve 105 to the front wheel-drive clutch 99 opens, as shown in FIG. 5, at an outer surface of the valve housing 68. The differential-lock clutch 101 is designed such that it is engaged by the action of hydraulic cylinder 102 and is disengaged by the action of hydraulic cylinder 103. The directional control valve 106 for the lock clutch 101 has a clutch-disengaging position I and a clutch-engaging position II. Connecting ports 110 and 111 for connecting the directional control valve 106 to the hydraulic cylinders 102 and 103 open, as shown in FIG. 5, at the outer surface of valve housing 68.

The high/low speed-selecting mechanism 10 is designed, as already described, such that the fluid-operated clutch 45 is actuated by applying fluid pressure to the piston 45b while the fluid-operated clutch 46 is disactuated simultaneously due to fluid pressure applied to the piston 49 of hydraulic cylinder 47 and such that the fluid-operated clutch 46 is actuated due to the force of springs 46b by draining fluid pressure applied to the piston 49 of hydraulic cylinder 47 while the fluid-operated clutch 45 is disactuated simultaneously due to the drain of fluid pressure applied to the piston 45b. As shown in FIG. 7, the directional control valve 76 for the selecting mechanism 10 has a high speed position H, in which the fluid-operated clutch 45 for the high speed transmission is actuated, and a low speed position L in which the fluid-operated clutch 46 for the low speed transmission is actuated. A relief valve 112 for determining the fluid pressure of lubricant is provided at the downstream side of relief valve 104, and a lubricant supply path 113 for the fluid-operated clutches 45 and 46 is led out from the fluid path between the relief valves 104 and 112. A fluid passage for connecting the directional control valve 76 toward the fluid-operated clutches 45 and 46 and another fluid passage constituting a part of the lubricant supply path 113 are communicated respectively to the fluid passages 62H and 62L in the fluid passage-forming plate 62H and 62L shown in FIG. 4 and then to the pipes 64H and 64L.

As shown in FIG. 7, the fluid-operated PTO clutch 26 is associated with a brake 115 for braking the driven side of PTO clutch 26 at a disengaged condition of clutch 26 and a clutch 28a (FIG. 1) for operating the PTO speed change mechanism 28 is associated with an interlocking mechanism 116 for preventing the displacement of clutch 28a at an engaged condition of PTO clutch 26. The PTO clutch 26, brake 115 and interlocking mechanism 116 are controlled by a valve assembly shown in a right hand of FIG. 7.

This valve assembly is already well-known and, therefore, will be described briefly. A directional control valve 117 for the PTO clutch 26 is connected to the divided flow path 86. The downstream side of this directional control valve 117 is connected to the PTO clutch 26 through a fluid path 118, a relief valve 119 operable at a relatively low relief pressure, and a fluid path 120. An intermediate portion of the fluid path 120 is connected to the directional control valve 117 through a fluid return path 121. A well-known modulating-type relief valve 123 is connected to the fluid path 120 through a pilot valve 122 which is displaced to its operative position by fluid pressure in the fluid path 120. The directional control valve 117 has a disengaging position I and an engaging position II for the PTO clutch 26, and the modulating-type relief valve 123 is operable to increase fluid pressure applied to the PTO clutch 26 gradually as from the time when the directional control valve 117 is displaced to its engaging position II.

A directional control valve 124 for the brake 115 is connected also to the divided flow path 86. The directional control valve 124 is designed into a pilot valve which is displaced from a brake-actuating position I to a brake-disactuating position II by fluid pressure in the fluid path 118. The brake 115 is composed of a single-acting hydraulic cylinder which is actuated by fluid pressure and is disactuated by the action of a spring 115a. The directional control valve 124 supplies fluid pressure in the divided flow path 86 to the brake 115 at its brake-actuating position I whereas it is displaced to its brake-disactuating position II so as to drain fluid pressure from the brake 115 at an engaged condition of PTO clutch 26 where fluid pressure is established in the fluid path 118.

The interlocking mechanism 116 is designed such that a rockable locking member 28b, which is moved together with the displacement of clutch 28a (FIG. 1), is selectively locked by a single-acting hydraulic cylinder 116a which is placed in its non-locking position by a spring 116b. The fluid path 118 is connected to the hydraulic cylinder 116a via a fluid path 125 so that the cylinder 116a is actuated at an engaged condition of PTO clutch 26 where fluid pressure is established in the fluid path 118.

A lubricant supply path 127 for supplying lubricant to the PTO clutch 26 is led out from the fluid path between the relief valves 104 and 112. The relief path from the modulating-type relief valve 123 is joined to the lubricant supply path 127.

As shown in FIG. 7, there are provided a connecting port 128 for the PTO clutch 26, a connecting port 129 for the brake 129, a connecting port 130 for the interlocking mechanism 116, and a connecting port 131 for connecting the lubricant supply path 127 toward the PTO clutch 26. As shown in FIG. 5, these connecting ports 128, 129, 130 and 131 open at the outer surface of valve housing 68, too.

The other parts of the transmission assembly shown will be outlined hereinafter. As shown in FIG. 2, the hollow driven shaft 13 and the hollow drive shaft 16 are coupled using one of the gears 42 of high/low speed-selecting mechanism 10 as a coupling member. As shown in FIGS. 3 and 4, the idler gear 36 of direction-reversing mechanism 9 is supported at its support shaft 36a by the bearing support wall 4.

As shown in FIG. 1, the main speed change mechanism 14 comprises four gears 133, 134, 135 and 136 which are fixedly mounted on the drive shaft 16, four gears 137, 138, 139 and 140 which are rotatably mounted on the driven shaft 17 and are meshed respectively with the corresponding gears on the drive shaft 16, and two double-acting synchronizer clutches 141 and 142 which are mounted on the driven shaft 17 at locations between the gears 137 and 138 and between the gears 139 and 140, respectively. The change mechanism 14 provides four speed change ratios by selectively coupling the gears 137-140 one at a time to the driven shaft 17.

As also shown in FIG. 1, the counter shaft 18 of auxiliary speed change mechanism 15 is connected to the driven shaft 17 through a speed-reduction gearing composed of meshing gears 144 and 145. Two gears 146 and 147 are fixedly mounted on the counter shaft 18, and a gear 149, which is connected to the gear 147 through a speed-reduction gear mechanism 148, is provided at a location outside the counter shaft 18. On the propeller shaft 19, a shift gear 150, which is meshable selectively with the gears 149 and 147, is slidably but non-rotatably mounted and a gear 151, which is meshed with the gear 146, is rotatably mounted. Further, there is mounted on the propeller shaft 18 a double-acting clutch 152 which is selectively shifted to a position, where it couples the gear 151 to the propeller shaft 19, and to another position where it couples the propeller shaft 19 directly to the driven shaft 17. The auxiliary speed change mechanism 15 provides to the propeller shaft 19 a first speed rotation when the shift gear 150 is meshed with the gear 149, a second speed rotation when the shift gear 150 is meshed with the gear 147, a third speed rotation when the gear 151 is coupled to the propeller shaft 19, and a fourth speed rotation when the propeller shaft 19 is coupled directly to the driven shaft 17.

When the main or auxiliary speed change mechanism 14 or 15 is to be operated, the pressure-reducing valve 89 is displaced to its unloading position C by the pedal 92 shown in FIG. 6 so as to once cut off the drive transmission fine by means of direction-reversing mechanism 9.

Additionally, the placement of direction-reversing mechanism 9 and high/low speed-change mechanism 10 in the longitudinal direction of vehicle shown may be reversed.

We claim:

1. In a working vehicle comprising a front housing (1) and a transmission case (2) which are arranged in series in a longitudinal direction of the vehicle and are fastened together, said front housing including at its front end portion an engine flywheel (6) and said transmission case including at least one speed change mechanism (14, 15), a transmission assembly characterized in:

that there are provided within said front housing (1) two fluid-operated supplementary speed change mechanisms (9, 10) which are disposed before and behind a bearing support wall (4) and are connected to each other in series, said bearing support wall dividing the inside of said front housing into front and rear chambers, one of said supplementary speed change mechanisms being formed into a direction-reversing mechanism and the other of said supplementary speed change mechanisms being formed into a high/low speed-selecting mechanism, and that two transmission shafts (8, 12), on which fluid-operated clutches (38F, 38R, 45, 46) of said supplementary speed change mechanisms (9, 10) are mounted, are disposed non-coaxially with each other and are supported by said bearing support wall (4), rotary joints (54F, 54R, 54L 55H, 55L) for connecting fluid passages (51F, 51R, 51L, 52H, 52L), which are formed in said two transmission shafts and are in fluid communication with said fluid-operated clutches, to stationary fluid passages being formed in outer circumferences of said two transmission shafts (8, 12) at an inside of said bearing support wall (4).

2. The transmission assembly as set forth in claim 1, wherein one of the two fluid-operated clutches (45) of said high/low speed-selecting mechanism (10) is formed into a fluid-actuated clutch which is actuated by the action of fluid pressure and is disactuated by the action of a spring (45a) whereas the other of the two fluid-operated clutches (46) of said high/low speed-selecting mechanism is formed into a spring-actuated clutch which is actuated by the action of a second spring (46a) and is disactuated by the action of fluid pressure, said two fluid-operated clutches (45, 46) being adapted to be supplied with fluid pressure at a same time through a single fluid passage (52H) formed in said transmission shaft (12) on which said two fluid-operated clutches are mounted.

3. The transmission assembly as set forth in claim 1, wherein said bearing support wall (4) is detachably secured to said front housing (1).

4. The transmission assembly as set forth in claim 1, wherein there is detachably secured to an outer wall of said front housing (1) a fluid passage-forming plate (57) including other fluid passages (61F, 61R, 61L, 62H, 62L) which are in fluid communication with said rotary joints (54F, 54R, 54L, 55H, 55L), said other fluid passages and said rotary joints being connected through pipes (63F, 63R, 63L, 64H, 64L) which extend through openings (65, 66) formed in said outer wall of said front housing (1).

5. The transmission assembly as set forth in claim 4, wherein a directional control valve (90) for said direction-reversing mechanism (9) and a second directional control valve (76) for said high/low speed-selecting mechanism (10) are attached to said fluid passage-forming plate (57).

6. The transmission assembly as set forth in claim 1, wherein said transmission shaft (8) of said direction-reversing mechanism (9), which is disposed at an upstream side of said high/low speed-selecting mechanism (10), is arranged at a level higher than the level of said transmission shaft (12) of said high/low speed-selecting mechanism.

7. The transmission assembly as set forth in claim 1, wherein said bearing support wall (4) is detachably secured to said front housing (1) and wherein another bearing support wall (5) is detachably secured to said front housing at a location spaced from and behind said bearing support wall, one of said supplementary speed change mechanisms (9) being disposed before said bearing support wall (4) whereas the other of said supplementary speed change mechanisms (10) being disposed between said bearing support wall (4) and said another bearing support wall (5).

* * * * *